(12) United States Patent
Ballard

(10) Patent No.: US 6,427,635 B1
(45) Date of Patent: Aug. 6, 2002

(54) VEHICLE SAFETY RESTRAINT FOR CANINES

(76) Inventor: Tammy Ballard, 2607 Camp Philips Rd., Wausau, WI (US) 54403

( * ) Notice: Subject to any disclaimer, the term of this patent is extended or adjusted under 35 U.S.C. 154(b) by 0 days.

(21) Appl. No.: 09/999,347

(22) Filed: Nov. 27, 2001

(51) Int. Cl.$^7$ ................................................ A01K 27/00
(52) U.S. Cl. ...................................... 119/771; 119/792
(58) Field of Search .................................. 119/771, 770, 119/792, 774, 772, 864, 856, 793, 794, 863; 297/485, 468, 483

(56) References Cited

U.S. PATENT DOCUMENTS

| | | | |
|---|---|---|---|
| 3,310,034 A | * 3/1967 | Dishart | 119/771 |
| 4,597,359 A | * 7/1986 | Moorman | 119/28.5 |
| 4,676,198 A | * 6/1987 | Murray | 119/771 |
| 4,709,966 A | * 12/1987 | Parkinson et al. | 297/473 |
| 4,827,876 A | 5/1989 | Krekelberg | |
| 4,896,630 A | 1/1990 | Luce | |
| 4,970,991 A | 11/1990 | Luce | |
| 5,154,660 A | * 10/1992 | Snyder et al. | 119/771 |
| D343,032 S | 1/1994 | Carrero | |
| 5,427,061 A | 6/1995 | McCullough | |
| D360,711 S | 7/1995 | O'Neill | |
| 5,443,037 A | * 8/1995 | Saleme | 119/771 |
| 5,676,093 A | * 10/1997 | Sporn | 119/792 |
| 5,713,308 A | * 2/1998 | Holt, Jr. | 119/792 |
| 5,718,190 A | 2/1998 | Tinker | |
| 5,794,571 A | * 8/1998 | Goldberg | 119/771 |
| 5,915,335 A | 6/1999 | Holt, Jr. | |
| 6,079,369 A | 6/2000 | Hill et al. | |
| 6,253,713 B1 | * 7/2001 | Giedeman et al. | 119/771 |

FOREIGN PATENT DOCUMENTS

| | | |
|---|---|---|
| DE | 3837507 A1 | * 7/1988 |
| WO | WO 88/00540 | * 1/1988 |

* cited by examiner

*Primary Examiner*—Yvonne R. Abbott
(74) *Attorney, Agent, or Firm*—P. Jeff Martin

(57) ABSTRACT

A vehicle safety restraint for canines is provided for safely securing a canine in a vehicle. The vehicle safety restraint for canines has an upper restraint designed to be positioned longitudinally over the canine's back during use. A lower restraint is designed to be positioned longitudinally against the canine's stomach during use. A neck strap is bifurcated and thus provides a collar throughwhich the canine's head and neck pass. A harness strap has a length which allows for ample canine mobility, while still resulting in sufficient confined boundaries for effectively restraining the canine in the event of a sudden stop or impact from an accident. A leash strap is looped around a prior fastened vehicle seat belt having been tightly adjusted against a vehicle seat so as to anchor the vehicle safety restraint for canines.

12 Claims, 2 Drawing Sheets

VEHICLE SAFETY RESTRAINT FOR CANINES

RELATED APPLICATIONS

There are no previously filed, nor currently any co-pending applications, anywhere in the world.

BACKGROUND OF THE INVENTION

1. Field of the Invention

The present invention relates generally to a dog harness and, more particularly, to a vehicle safety restraint for canines.

2. Description of the Related Art

Whether heading to the local supermarket, veterinarian, or just out for a casual drive in the country, dogs have become common passengers in vehicles. In unprecedented numbers, Americans are even taking their four-legged friends on vacation with them. From Disney, to the beach, to Manhattan, by plane, train, or automobile, Americans simply can't stand the thought of leaving their dog home alone. While some dogs feel right at home sitting on an automobile seat, or sticking their head out of the automobile window, many dogs are uncomfortable in a moving vehicle thus causing them distress, and in turn, the dogs begin to constantly move about within the automobile. However, an unsecured dog riding in an automobile can lead to serious and sometimes fatal injuries in the event of a sudden stop or impact from an accident.

Accordingly, a need has arisen for a means by which to not only safely secure a canine in a vehicle, but which also allows for ample canine mobility, while still resulting in sufficient confined boundaries for effectively restraining the canine in the event of a sudden stop or impact from an accident in a manner which is quick, easy, and efficient.

A search of the prior art did not disclose any patents that read directly on the claims of the instant invention; however, the following references were considered related. The following patents disclose the design and function for an animal safety tether for attachment to the bed of a pick-up truck: U.S. Pat. No. 6,079,369 issued in the name of Hill et al.; U.S. Pat. No. 5,718,190 issued in the name of Tinker; U.S. Pat. No. 4,827,876 issued in the name of Krekelberg; U.S. Pat. No. D 360,711 issued in the name of O'Neill; and U.S. Pat. No. D 343,032 issued in the name of Carrero.

The following patents disclose a dog restraining harness for use in an automobile: U.S. Pat. No. 5,915,335 issued in the name of Holt, Jr.; U.S. Pat. No. 5,427,061 issued in the name of McCullough; U.S. Pat. No. 4,970,991 issued in the name of Luce; and U.S. Pat. No. 4,896,630 issued in the name of Luce.

Consequently, a need has been felt for providing a device which safely secures a canine in a vehicle and which allows for ample canine mobility, while still resulting in sufficient confined boundaries for effectively restraining the canine in the event of a sudden stop or impact from an accident in a manner which is quick, easy, and efficient.

SUMMARY OF THE INVENTION

Therefore, it is an object of the present invention to provide a vehicle safety restraint for canines which easily attaches around a prior fastened vehicle seat belt.

It is another object of the present invention to provide a canine restraining device having adjustable webbing buckles for accommodating dogs of various sizes.

It is still another object of the present invention to provide a canine restraining device having a neck strap for providing a collar through which the canine's head and neck pass.

It is still another object of the present invention to provide a canine restraining device with a neck strap having adjustable webbing buckles so as to allow the collar to be enlarged or recoiled in order to provide a snug fit around the canine's neck.

It is another object of the present invention to provide a canine restraining device with an upper restraint designed to be positioned longitudinally over the canine's back during use.

It is another object of the present invention to provide a canine restraining device with a lower restraint designed to be positioned longitudinally against the canine's stomach during use.

It is another object of the present invention to provide a canine restraining device having a metal ring to provide added structural rigidity to the present invention.

It is another object of the present invention to provide a harness strap having a length which allows for ample canine mobility, while still resulting in sufficient confined boundaries for effectively restraining the canine in the event of a sudden stop or impact from an accident.

It is another object of the present invention to provide a canine restraining device having a leash strap designed to be looped around a prior fastened vehicle seat belt.

It is another object of the present invention to provide a canine restraining device having a leash strap with a leash connection ring for walking the canine so as to eliminate the need to remove the present invention during short rest periods while traveling.

Briefly described according to one embodiment of the present invention, a vehicle safety restraint for canines includes an upper restraint, a lower restraint, a neck strap, a harness strap, and a leash strap. Restraints, neck strap, harness strap, and leash strap are fabricated from a woven webbing. The upper restraint has a length measuring approximately 5 inches and is designed to be positioned longitudinally over the canine's back during use. The lower restraint has a length measuring approximately 6 inches and is designed to be positioned longitudinally against the canine's stomach during use.

The neck strap is bifurcated and thus provides a collar through which the canine's head and neck pass.

The harness strap has a length which allows for ample canine mobility, while still resulting in sufficient confined boundaries for effectively restraining the canine in the event of a sudden stop or impact from an accident.

The leash strap is designed to be looped around a prior fastened vehicle seat belt having been tightly adjusted against a vehicle seat. The leash strap includes a leash connection ring for walking the canine so as to eliminate the need to remove the present invention during short rest periods while traveling.

The use of the present invention serves to safely secure a canine in a vehicle and allow for ample canine mobility, while still resulting in sufficient confined boundaries for effectively restraining the canine in the event of a sudden stop or impact from an accident in a manner which is quick, easy, and efficient.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which.

DESCRIPTION OF THE PREFERRED EMBODIMENT

1. Detailed Description of the Figures

Figure 1:
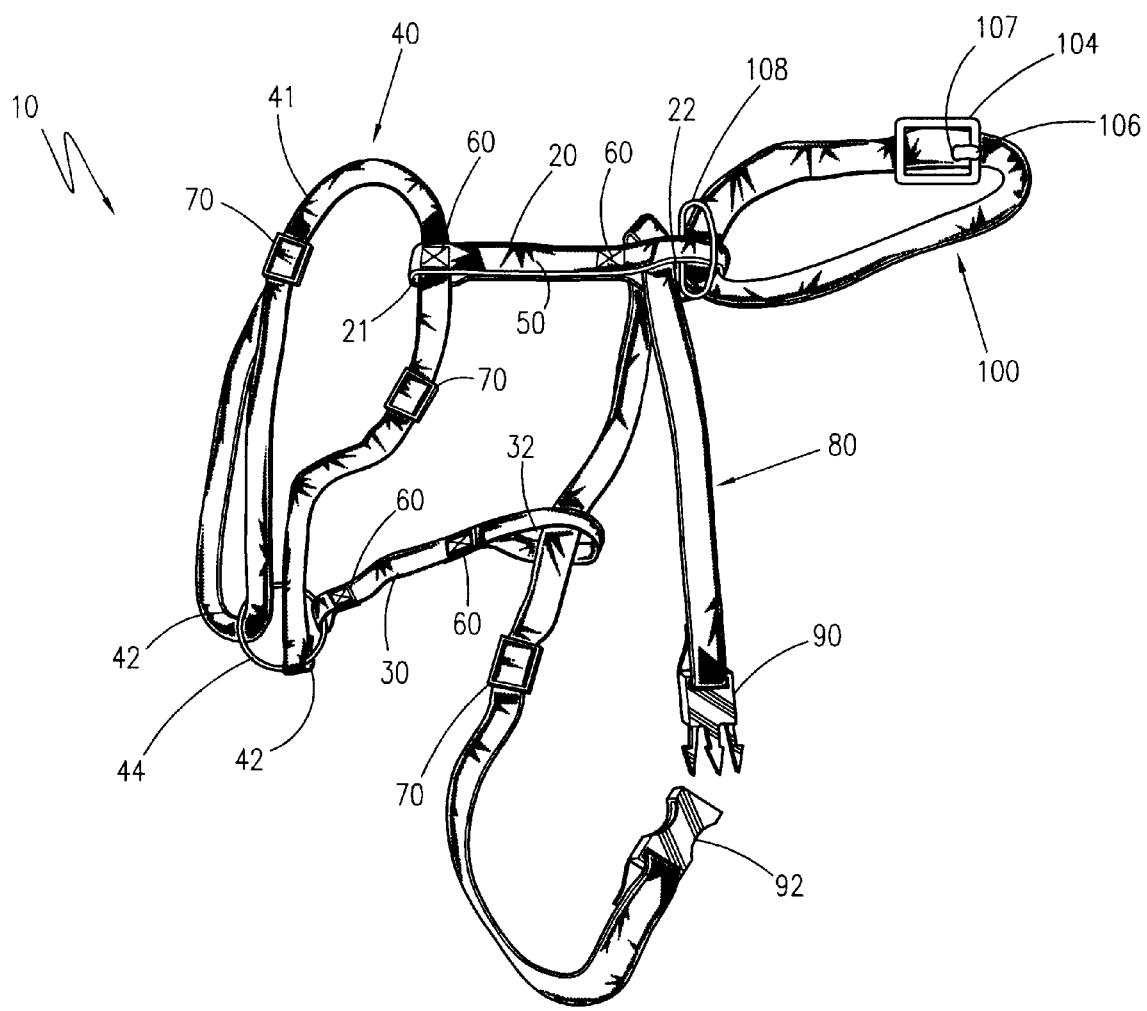
FIG. 1 is a perspective view of a vehicle safety restraint for canines according to the preferred embodiment of the present invention.
Figure 2:
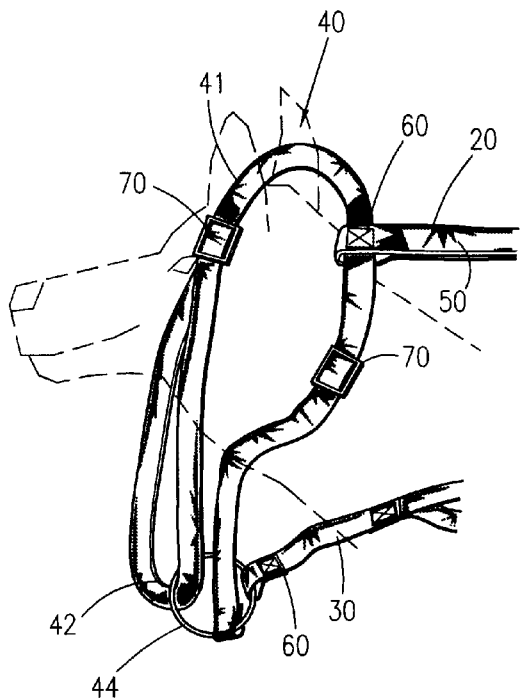
FIG. 2 is a partial perspective view of the vehicle safety restraint for canines showing the collar as a passageway for the canine's head and neck according to the preferred embodiment of the present invention.
Figure 3:
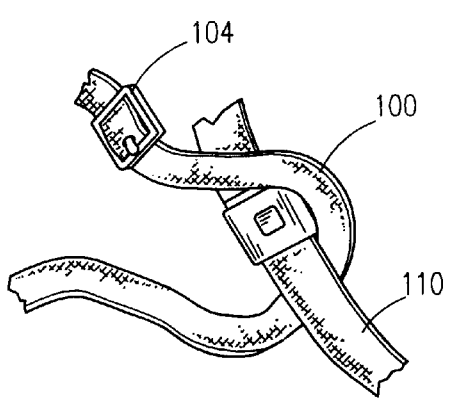
FIG. 3 shows a method of attaching the leash strap to a vehicle's clamped seatbelt according to the preferred embodiment of the present invention.
Figure 4:
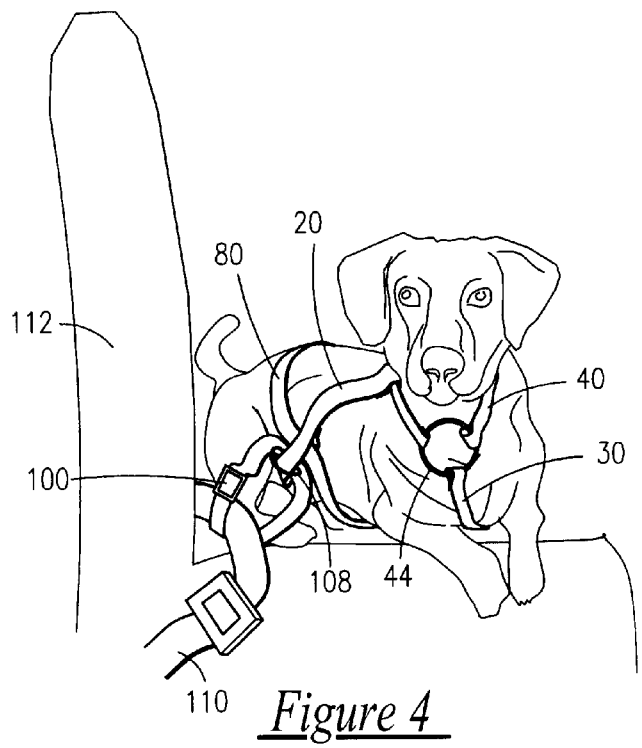
FIG. 4 is a perspective view of the vehicle safety restraint for canines shown in-use according to the preferred embodiment of the present invention.

Referring now to FIGS. 1–4, a vehicle safety restraint for canines 10 is shown, according to the present invention, comprised of an upper restraint 20, a lower restraint 30, a neck strap 41, and a harness strap 80. Restraints 20, 30, neck strap 41, and harness strap 80 are fabricated from a woven webbing 50, wherein the woven webbing 50 is preferably fabricated from a member selected from the group consisting of nylon and polyester. Utilization of woven webbing 50 provides a material having suitable strength and which readily conforms to a chosen canine.

The upper restraint 20 has a length measuring approximately 5 inches. The upper restraint 20 is designed so as to be positioned longitudinally over the canine's back during use. The upper restraint 20 is further defined as having the neck strap 41 secured within a first loop 21 at an end of the upper restraint 20 via heavy stitching 60. The neck strap 41 has a pair of adjustable webbing buckles 70 secured thereto so as to allow for various linear lengths thereof. The neck strap 41 extends at a downward angle from the upper restraint 20 in a bifurcating fashion so as to form ends terminating into loops 42 (to be described in greater detail below). Being bifurcated, the neck strap 41 provides a collar 40 through which the canine's head and neck pass. By adjusting each adjustable webbing buckle 70 secured to the neck strap 41, the collar 40 may be enlarged or recoiled so as to provide a snug fit around the canine's neck.

The loops 42 are looped around a metal ring 44 of high strength. The metal ring 44 serves to provide added structural rigidity to the present invention. Being a main stress point, the metal ring 44 is an area which would absorb a considerable force of impact upon a sudden stop or accident. Therefore, the design and configuration of the metal ring 44 as an attachment means for the neck strap 41 affords important utility for safely and effectively absorbing forces impacting the present invention.

The lower restraint 30 has a length measuring approximately 6 inches. The lower restraint 30 is looped at an end thereof around the metal ring 44 to a folded position and heavily sewn via stitching 60 so as to ensure movable but stable securement to the metal ring 44. The lower restraint 30 is positioned parallel with respect to upper restraint 20 and is designed to be positioned longitudinally against the canine's stomach during use.

The harness strap 80 is of an elongated configuration having a length measuring approximately 30 inches. The harness strap 80 passes through a second loop 22 formed at an opposite end of first loop 21 of the upper restraint 20. The second loop 22 maintains its configuration via heavy stitching 60 just rear thereto. The second loop 22 is further defined as having a diameter allowing for the harness strap 80 to slide freely therethrough. The harness strap 80 further passes through a loop 32 formed at an end of the lower restraint 30 being opposite to lower restraint's 30 connection point to the metal ring 44. The loop 32 maintains its configuration via heavy stitching 60 just rear thereto. The loop 32 is further defined as having a diameter allowing for the harness strap 80 to slide freely therethrough.

The harness strap 80 includes a male attachment 90 attached to an end thereof for being removably connected to a female attachment 92 attached at an opposite end thereof. An adjustable webbing buckle 70 is secured to the harness strap 80 so as to increase or decrease a length thereof for accommodating canines of various sizes. The length of the harness strap 80 allows for ample canine mobility, while still resulting in sufficient confined boundaries for effectively restraining the canine in the event of a sudden stop or impact from an accident. The harness strap 80 allows the canine to travel in a standing, sitting, or lying position. Thus, the harness strap 80 allows the canine to travel more comfortably on extended trips.

Finally, a leash strap 100 is provided which imparts important functional utility to the present invention as will be described hereinbelow. The leash strap 100 is looped around loop 22 of the upper restraint 20, and functions as an anchor to the present invention. The leash strap 100 includes a buckle 104 having a buckle securement finger 106 for being removably inserted within a finger receiving aperture 107 in the leash strap 100. The leash strap 100 is designed to be looped around a prior fastened vehicle seat belt 110 having been tightly adjusted against vehicle seat 112, and then buckled, thereby securely anchoring the present invention to a prior fastened vehicle seat belt 110.

The leash strap 100 further has a leash connection ring 108 retained within loop 22 so as to allow the present invention to be utilized in conjunction with a typical canine leash for walking the canine, thus eliminating the need to remove the vehicle safety restraint for canines 10 during short rest periods while traveling.

2. Operation of the Preferred Embodiment

To use the present invention, the user pulls the collar 40 over the dog's head and down its neck. The user next adjusts the adjustable webbing buckles 70 located on the collar to provide a snug fit around the canine's neck. Next, the user positions the upper restraint 20 longitudinally over the canine's back and positions the lower restraint 30 longitudinally against the canine's stomach. The user adjusts the adjustable webbing buckle 70 of the harness strap 80 to increase or decrease a length thereof to accommodate the size of user's canine, and to allow ample canine mobility, while still resulting in sufficient confined boundaries for effectively restraining user's canine in the event of a sudden stop or impact from an accident. The user removably connects the male attachment 90 to the female attachment 92. Finally, the user loops the leash strap 100 around a prior fastened vehicle seat belt 110 having been tightly adjusted against the vehicle seat 112, and buckles the buckle 104, thereby securely anchoring the canine via the present invention to a prior fastened vehicle seat belt 110.

During short rest periods while traveling, the user may removably connect a typical canine leash to the leash connection ring 108.

The use of the present invention serves to safely secure a canine in a vehicle and allow for ample canine mobility, while still resulting in sufficient confined boundaries for effectively restraining the canine in the event of a sudden stop or impact from an accident in a manner which is quick, easy, and efficient.

Therefore, the foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. Therefore, the scope of the invention is to be broadly limited only by the following claims.

What is claimed is:

1. A vehicle safety restraint for canines comprising:
    an upper restraint, said upper restraint has a length measuring approximately 5 inches, and is designed so as to be positioned longitudinally over a canine's back during use;
    a lower restraint, said lower restraint has a length measuring approximately 6 inches, said lower restraint is positioned parallel with respect to said upper restraint, and is designed to be positioned longitudinally against the canine's stomach during use;
    a neck strap, said neck strap extends at a downward angle from said upper restraint in a bifurcating fashion so as to form ends terminating into loops, and wherein said neck strap provides a collar throughwhich the canine's head and neck pass; and
    a harness strap, said harness strap is of an elongated configuration having a length measuring approximately 30 inches, said harness strap includes a male attachment attached to an end of said harness strap for being removably connected to a female attachment attached to an opposite end of said harness strap.

2. The vehicle safety restraint for canines of claim 1, wherein said upper restraint includes a first loop formed opposite a second loop, and wherein said first loop and said second loop are located at opposed ends of said upper restraint.

3. The vehicle safety restraint for canines of claim 1, wherein said lower restraint is looped at an end thereof around a metal ring to a folded position and heavily sewn via stitching so as to ensure movable but stable securement to said metal ring, and wherein said metal ring is of high strength to provide added structural rigidity for absorbing a considerable force of impact upon a sudden stop or accident.

4. The vehicle safety restraint for canines of claim 1, wherein said neck strap is secured within said first loop at an end of said upper restraint via heavy stitching, and said neck strap has a pair of adjustable webbing buckles secured to said neck strap so as to allow for various linear lengths of said neck strap.

5. The vehicle safety restraint for canines of claim 1, wherein said harness strap passes through said second loop of said upper restraint, wherein said second loop maintains its configuration via heavy stitching just rear of said second loop, and said second loop has a diameter allowing for said harness strap to slide freely through said second loop.

6. The vehicle safety restraint for canines of claim 5, wherein said harness strap further passes through a loop formed at an end of said lower restraint opposite to a connection point of said lower restraint to said metal ring, wherein said loop maintains its configuration via heavy stitching just rear of said loop, and said loop has a diameter allowing for said harness strap to slide freely through said loop.

7. The vehicle safety restraint for canines of claim 6, wherein said harness strap includes an adjustable webbing buckle secured to said harness strap so as to increase or decrease a length of said harness strap for accommodating canines of various sizes.

8. The vehicle safety restraint for canines of claim 1, further comprising:
    a leash strap, said leash strap is looped around said second loop of said upper restraint and functions as an anchor.

9. The vehicle safety restraint for canines of claim 8, wherein said leash strap includes a buckle having a buckle securement finger for being removably inserted within a finger receiving aperture formed in said leash strap.

10. The vehicle safety restraint for canines of claim 9, wherein said leash strap is looped around a prior fastened vehicle seat belt having been tightly adjusted against a vehicle seat, and then buckling said leash strap, thereby securely anchoring said vehicle safety restraint for canines to a prior fastened vehicle seat belt.

11. The vehicle safety restraint for canines of claim 10, wherein said leash strap further includes a leash connection ring retained within said second loop of said upper restraint; wherein said leash connection ring is utilized in conjunction with a typical canine leash for walking the canine, thus eliminating a need to remove said vehicle safety restraint for canines during short rest periods while traveling.

12. The vehicle safety restraint for canines of claim 1, wherein said upper restraint, said lower restraint, said neck strap, and said harness strap are fabricated from a woven webbing, wherein said woven webbing is fabricated from a member selected from the group consisting of nylon and polyester.

* * * * *